United States Patent
Kruusenberg

(10) Patent No.: US 11,283,125 B2
(45) Date of Patent: Mar. 22, 2022

(54) PORTABLE FUEL CELL BACKUP GENERATOR SYSTEM

(71) Applicant: PowerUp Energy Technologies Inc., Berkeley, CA (US)

(72) Inventor: Ivar Kruusenberg, Berkeley, CA (US)

(73) Assignee: POWERUP ENERGY TECHNOLOGIES, INC., Berkeley, CA (US)

(*) Notice: Subject to any disclaimer, the term of this patent is extended or adjusted under 35 U.S.C. 154(b) by 423 days.

(21) Appl. No.: 16/417,917

(22) Filed: May 21, 2019

(65) Prior Publication Data

US 2020/0044299 A1    Feb. 6, 2020

Related U.S. Application Data

(63) Continuation of application No. PCT/US2017/063127, filed on Nov. 22, 2017.

(60) Provisional application No. 62/425,292, filed on Nov. 22, 2016.

(51) Int. Cl.
| | |
|---|---|
| *H01M 16/00* | (2006.01) |
| *H01M 8/04664* | (2016.01) |
| *H02J 3/38* | (2006.01) |
| *H02J 7/34* | (2006.01) |
| *H02J 9/06* | (2006.01) |
| *H02J 1/10* | (2006.01) |

(52) U.S. Cl.
CPC ..... *H01M 16/006* (2013.01); *H01M 8/04679* (2013.01); *H02J 1/10* (2013.01); *H02J 3/381* (2013.01); *H02J 7/345* (2013.01); *H02J 9/061* (2013.01); *H01M 2220/30* (2013.01); *H01M 2250/30* (2013.01); *H02J 2300/30* (2020.01)

(58) Field of Classification Search
CPC .......... H01M 16/006; H01M 8/04679; H01M 2220/30; H01M 2250/30; H01M 16/00; H01M 8/04664; H02J 1/10; H02J 3/381; H02J 3/38; H02J 7/345; H02J 9/061; H02J 2300/30; H02J 7/34; H02J 9/06
See application file for complete search history.

(56) References Cited

U.S. PATENT DOCUMENTS

| | | |
|---|---|---|
| 2003/0022045 A1 | 1/2003 | Wells et al. |
| 2004/0175598 A1 | 9/2004 | Bliven et al. |
| 2006/0127704 A1 | 6/2006 | Raiser |
| 2007/0037023 A1 | 2/2007 | Dunn et al. |
| 2007/0037026 A1 | 2/2007 | Wallace et al. |
| 2010/0253318 A1 | 10/2010 | Thomas, Sr. |
| 2012/0068669 A1 | 3/2012 | Trainor et al. |
| 2015/0308915 A1 | 10/2015 | Konatham et al. |

FOREIGN PATENT DOCUMENTS

WO    WO-2018098357 A1    5/2018

OTHER PUBLICATIONS

PCT/US2017/063127 International Search Report and Written Opinion dated Feb. 5, 2019.

*Primary Examiner* — Robert L Deberadinis
(74) *Attorney, Agent, or Firm* — Wilson Sonsini Goodrich & Rosati

(57) ABSTRACT

An electric power generating system is provided. The system comprises three sources of power including a set of fuel cells, a rechargeable battery, and a supercapacitor, wherein the distribution of power flowing from each of the sources to the other and to a user is controlled by a power control system.

10 Claims, 8 Drawing Sheets

PORTABLE FUEL CELL BACKUP GENERATOR SYSTEM

CROSS-REFERENCE

This application is a continuation of International Application No. PCT/US2017/063127, filed Nov. 22, 2017, which claims the benefit of U.S. Provisional Application No. 62/425,292 filed Nov. 22, 2016, each of which applications is entirely incorporated herein by reference.

BACKGROUND

These recent years have seen a fast-growing market for readily accessible backup power. Different types of activities often involve different power needs, such as faster or slower start up time, higher or lower operating temperatures, or higher or lower voltage, and may be better served by supply of power from a particular source of power over another, such as, for example, a supercapacitor over a battery. Especially in an age where so many activities and functions depend on a continuous supply of power, unpredictable lapses or interruptions in the provision of power may lead to highly undesirable results. In power-out emergencies, the availability of power storage devices in the near vicinity, such as batteries or capacitors, if suitable to provide power for the intended power use, can provide short term relief. However, such devices are often inherently finite, especially with those storage devices that are portable. That is, it may only store a finite amount of energy, and sometimes, in order to convert energy, it may be itself consumed. There is thus a high demand for a reliable backup power supply system that can last in the long term and be sufficiently compact.

Fuel cells are a type of energy conversion apparatus which can convert into electricity and heat the free energy change derived from the chemical reaction between oxygen and a source of fuel, typically hydrogen. A fuel cell may utilize invariant electrodes and electrolyte, and can convert electricity continuously, without exhaustion, for as long as the fuel is supplied.

SUMMARY

Recognized herein is the need for an efficient portable electric power generating system. The system may comprise different sources of power, including fuel cells, rechargeable batteries, and supercapacitors, and a power control system to navigate between the different sources of power.

The present disclosure provides an electric power generating system comprising a set of fuel cells, with an electronic valve at a fuel inlet, a rechargeable battery, a supercapacitor, a user-operable mode switch, and a power control system, including one or more processors and memory, communicatively coupled to the electronic valve and the user-operable mode switch, capable of electrically coupling or decoupling each of the set of fuel cells, battery, or supercapacitor relative to the other and relative to a user. The user-operable mode switch can be configured to, in a first instance, direct flow of power from the battery to an electronic device of a user and further direct flow of power from the set of fuel cells to the electronic device of the user or to the battery, and, in a second instance, direct flow of power from the supercapacitor to the electronic device of the user and further direct flow of power from the set of fuel cells to the electronic device of the user and to the supercapacitor.

The system may further comprise a power inlet port in electrical communication with the power generating system. The power inlet port may allow electrical connection of the power generating system to the grid, solar panels, wind turbines or other power supply sources to recharge batteries and/or supercapacitors in the power generating system.

The system may further comprise one or more sensors communicatively coupled to the power control system to detect the capacity and the capacitance of the battery and the supercapacitor, respectively, wherein the power control system can control the flow of power from the set of fuel cells to either or both the battery and the supercapacitor as a function of battery capacity and supercapacitor capacitance.

The system may further comprise one or more sensors communicatively coupled to the power control system to detect the power usage of the electronic device of the user, wherein the power control system can control the flow of power from the set of fuel cells to the electronic device of the user as a function of power usage.

In an aspect, provided is an electric power generating system, comprising: a set of fuel cells comprising an electronic valve at a fuel inlet; a rechargeable battery; a supercapacitor; a user-operable mode switch configured to (i) in a first instance, direct flow of power from the rechargeable battery to an electronic device of a user and direct flow of power from the set of fuel cells to the electronic device of the user or to the rechargeable battery, and (b) in a second instance, direct flow of power from the supercapacitor to the electronic device of the user and direct flow of power from the set of fuel cells to the electronic device of the user and to the supercapacitor; and a power control system, including one or more processors and memory, communicatively coupled to the electronic valve and the user-operable mode switch, wherein the power control system is capable of electrically coupling or decoupling each of the set of fuel cells, battery, or supercapacitor relative to the other and relative to the user.

In some embodiments, the electrical power generating system further comprises an electrical inlet port in electrical communication with the rechargeable battery or the supercapacitor, wherein the electrical inlet port is configured to receive power from a power grid, solar panels, wind turbines, or any other energy generation system, to charge the rechargeable battery or the supercapacitor.

In some embodiments, the electrical power generating system further comprises one or more sensors communicatively coupled to the power control system to detect the capacity and capacitance of the battery and the supercapacitor, respectively, wherein the power control system controls the flow of power from the set of fuel cells to either or both the battery and the supercapacitor as a function of battery capacity and supercapacitor capacitance.

In some embodiments, the electrical power generating system further comprises one or more sensors communicatively coupled to the power control system to detect the power usage of the electronic device of the user, wherein the power control system is configured to control the flow of power from the set of fuel cells to the electronic device of the user as a function of power usage.

In some embodiments, the electrical power generating system further comprises one or more sensors communicatively coupled to the power control system to detect leakage of fuel from the set of fuel cells, wherein the power control system is configured to close the electronic valve or give an alert signal to the user.

In some embodiments, the power control system is communicatively coupled to the electronic device of the user to provide the alert signal on the electronic device. In some embodiments, the electrical power generating system further comprises one or more ventilators configured to vent fluid gas, wherein the ventilators are communicatively coupled to the power control system, and the power control system is configured to operate the ventilators in response to detecting the leakage.

In some embodiments, the set of fuel cells is housed in a first compartment, the rechargeable battery is housed in a second compartment, the supercapacitor is housed in a third compartment, the power control system is housed in a fourth compartment, and wherein the first compartment, second compartment, third compartment, and fourth compartment is configured to modularly assemble or disassemble.

In some embodiments, the electrical power generating system further comprises an outer casing configured to enclose the set of fuel cells, the rechargeable battery, the supercapacitor, and the power control system.

In some embodiments, the outer casing is waterproof or corrosion proof.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
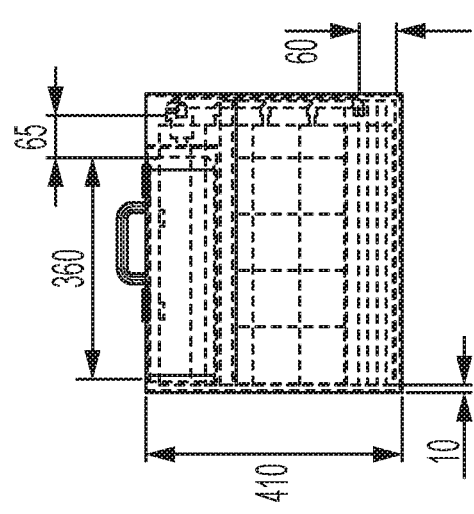
FIG. 1 shows an illustration of a fuel cell power generator as housed in portable casing.
Figure 1:
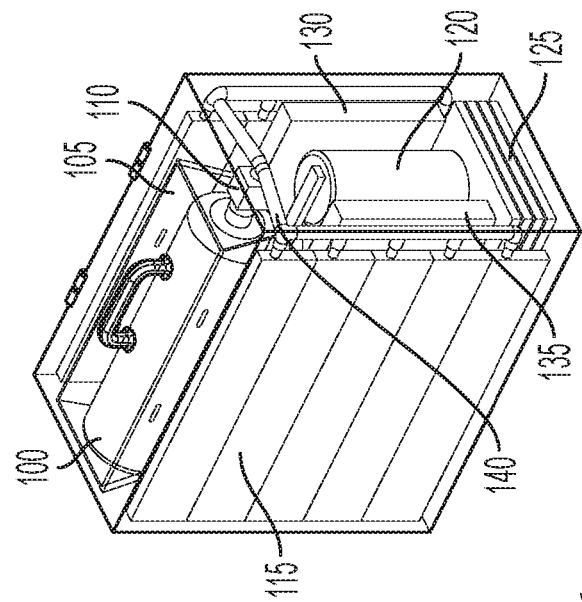
Figure 1:
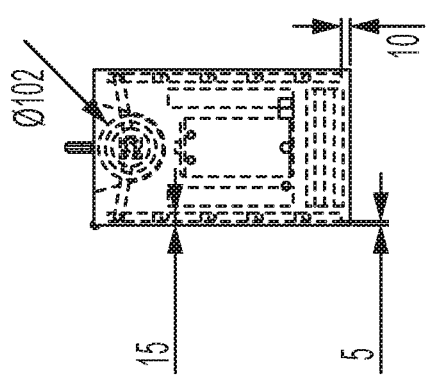
Figure 1:
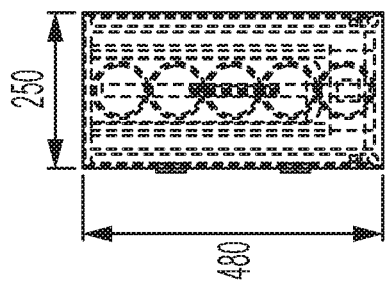

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

In an aspect, the present disclosure provides an electric power generating system comprising three different sources of power, including fuel cells, supercapacitors, and batteries, the flow of power from each of the three sources controlled by a power control system. The power generating system may store electrical energy. All three sources of power may be used to supply power to a user, and specifically, fuel cells may be used to both supply power to an electronic device of a user and recharge the batteries or the supercapacitors. The power control system, including one or more processors and memory, can be capable of electrically coupling or decoupling each of the fuel cell, battery, or supercapacitor relative to the other and relative to the user, and navigate the flow of power from each of the three sources to each other and to an electronic device of the user based on user needs and system efficiency. For example, different types of activities may involve different power needs, such as faster start up time and lower or higher operating temperatures. In an example, the generator system may offer a "jump start" mode for a user to select for when the user is using the generator system to jump start an engine or perform an operation requiring a similar power profile. In the jump start mode, the system may primarily draw power from the supercapacitors as opposed to the batteries. Alternatively or in addition to, in the jump start mode, the system may draw power from batteries with high discharging rates. Similarly, in a regular mode, such as for charging mobile electronic devices, the system may primarily draw power from the batteries. A user may freely select between the two modes via a user-operable mode switch communicatively coupled to the power control system. The mode switch may be configured to, in a first instance, direct flow of power from the battery to an electronic device of a user and further direct flow of power from the fuel cell to the electronic device of the user and to the battery. In a second instance, the user-operable mode switch can be configured to direct flow of power from the supercapacitor to the electronic device of the user and direct flow of power from the fuel cell to supply to the electronic device of the user and the supercapacitor.

The system may further comprise one or more sensors communicatively coupled to the power control system to detect battery capacity and supercapacitor capacitance, wherein the power control system can control the flow of power from the fuel cell to either or both the battery and supercapacitor as a function of battery capacity and supercapacitor capacitance. For example, the power control system may direct the fuel cell to start charging the battery or supercapacitor only when below a certain pre-programmed threshold capacity or capacitance.

The system may further comprise one or more sensors communicatively coupled to the power control system to detect the power usage of the electronic device of the user, wherein the power control system can control the flow of power from the fuel cell to the electronic device of the user as a function of power usage. For example, the power control system may direct the fuel cell to stop providing power to the user's electronic device if the power usage of the user's electronic device is below a certain pre-programmed threshold power usage.

The system may further comprise one or more safety features, such as sensors to detect possible leakage of fuel (e.g., hydrogen). The system may further comprise ventilators configured to vent fluid gas (e.g., flue) from one or more components of the system (e.g., a casing or box). In some instances, the ventilators may be communicatively coupled to the power control system. Upon detection of leakage, the power control system may instruct the ventilators to start venting.

Sources of Power

The system of the present disclosure comprises different sources of power, including fuel cells, supercapacitors, and batteries. Fuel cells are a type of energy conversion apparatus that can convert into electricity and heat the free energy change derived from the chemical reaction between oxygen and a source of fuel, typically hydrogen. While hydrogen fuel is widely used, alternatively, a fuel cell may consume other fuels such as hydrazine or hydrocarbon fuels, including diesel, methanol, ethanol and chemical hydrides. In an example, the system may use hydrogen fuel. A fuel cell may use as its feed hydrogen and air, from which oxygen is drawn, to produce electricity, water, and heat. The hydrogen fuel may be stored in a storage vessel capable of holding compressed gases. In an example, the storage vessel may be designed to contain hydrogen gas with pressures between 200 to 800 bars. The storage vessel may vary in size, and, for example, can be designed to hold between about 1 to about 1050 liters (L) of fuel. Alternatively, the storage vessel may hold less than about 1 L. Alternatively, the storage vessel may hold more than about 1050 L. Vessel size and pressure may be altered within or beyond the described boundaries to accommodate such considerations as portability of the generator system, economics, and safety.

To deliver power, two or more fuel cells can be combined in series or in parallel to yield a higher voltage or higher current, respectively. Such combinations can be referred to as a fuel cell stack. Alternatively, increasing the fuel cell's surface area, that is, where the chemical reaction occurs, may also generate higher current from the cell. A fuel cell may utilize invariant electrodes and electrolyte that can survive chemical reactions occurring within the fuel cell, as opposed to, for example, some electrochemical cells in batteries, to convert electricity continuously, without exhaustion, for as long as the fuel is supplied. Fuel cells may comprise different combinations of varying fuel, electrodes, and electrolytes which may classify the fuel cell to a distinct type of fuel cell, such as, for example, polymer electrolyte membrane (PEM) fuel cells, direct methanol fuel cells, alkaline fuel cells, and reversible fuel cells.

In an example, the system may comprise a PEM fuel cell or PEM fuel cell stack. The fuel cell stack may comprise one or more fuel cells arranged in series, or in parallel, and may be assembled in such a structure to ensure good contact between the adjoining fuel cells. Each fuel cell may comprise a pair of electrodes, including an anode and a cathode, separated by a proton exchange membrane acting as the electrolyte. The anode and cathode can each be formed from a porous, electrically conductive material that is permeable to the reactants, such as carbon fiber. The anode and cathode may each contain catalysts, such as by coating on the surface of the electrodes that is adjacent to the membrane, to activate the electrochemical reaction occurring, or to occur, in the fuel cell. The electrolyte may be a solid polymer. In an example, the system may comprise fuel cells with anodes and cathodes of porous high surface area carbon containing a platinum or platinum alloy catalyst. With such electrodes, the PEM fuel cell may require only hydrogen, oxygen which can be provided from the air, and water to operate. In an example, the system may comprise commercially available proton or anion exchange membranes such as one of, or a combination of, Nafion®, GORE-SELECT®, Poly Fuel®, Hoku®, Fumatech®, and Tokuyama® membranes. In this example, the fuel cell may operate at low temperatures, which can allow the fuel cell to start with less warm-up time.

Figure 6:
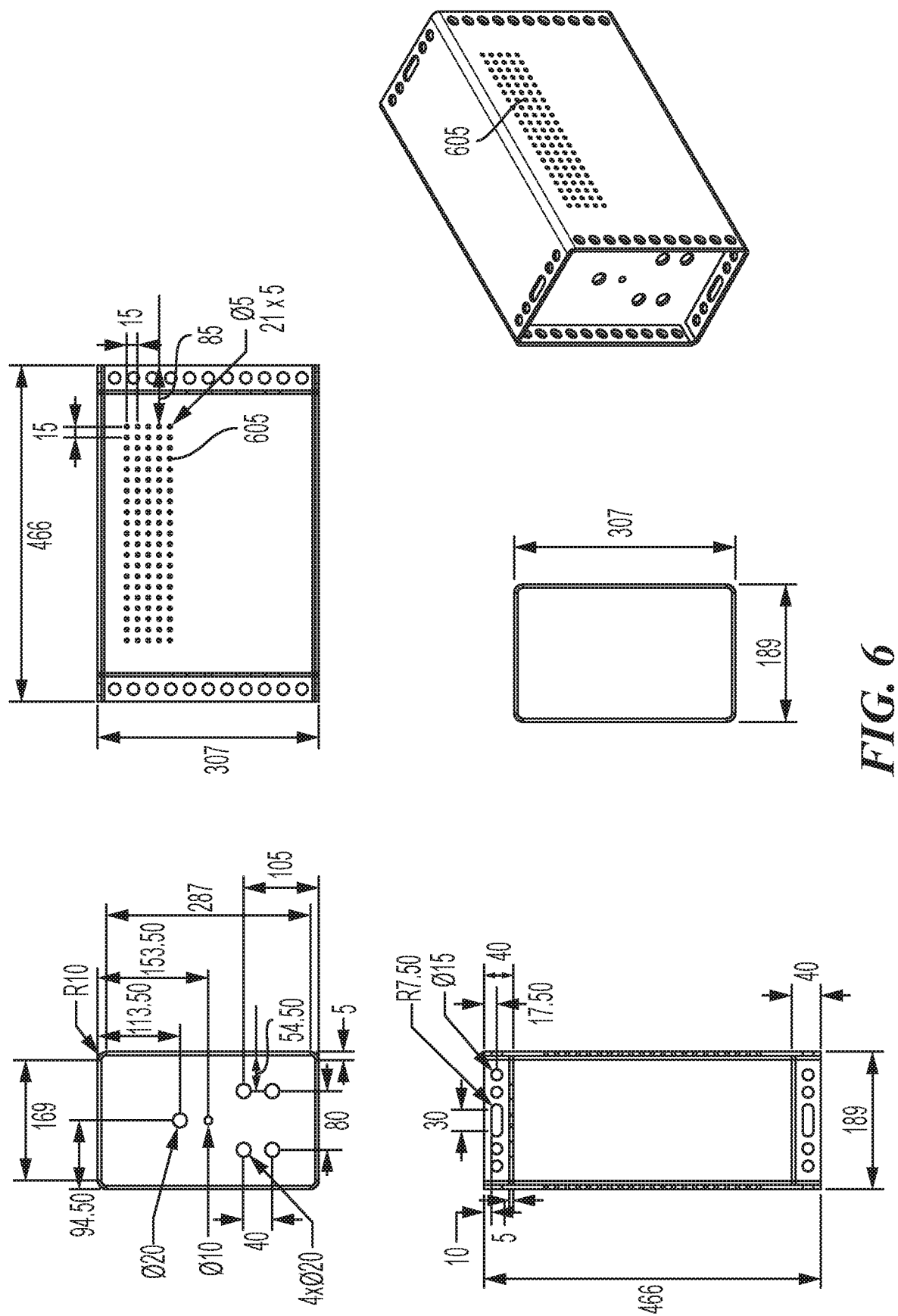
FIG. 6 shows examples of vent openings.

Each fuel cell may further comprise one or more flow channels to carry each of the reactants, such as hydrogen fuel and oxygen from the air, the flow channel for the fuel (e.g., hydrogen) directing the fuel to the anode and the flow channel for the oxidant (e.g., oxygen) directing the oxidant to the cathode. One or more flow channels may carry exhaust air and water discharge from out of the cathode and one or more flow channels may carry excess fuel from out of the anode. Alternatively, the fuel cell and fuel composition may be configured in such a way that the fuel feed is entirely consumed in the chemical reaction and there is little or no excess fuel being carried out of the anode. The fuel cell stack may comprise a fuel stream inlet port or channel and fuel stream outlet port or channel. The fuel stream inlet port may introduce the fuel feed into the fuel cell stack. The fuel stream outlet port may discharge an exhaust stream that may include water product from the chemical reaction in the fuel cell and such other components as unreacted fuel and excess air. Alternatively, the water product may discharge as steam and be evaporated away from the fuel cell stack. In an example, the vapor may leave through vents or other openings. One or more ventilators may be included to help the vapor exit the system. FIG. 6 shows examples of vent openings 605.

Supercapacitors, also known as ultracapacitors or double-layer capacitors, may comprise two plates, or electrodes, of larger areas than those of an ordinary capacitor. The distance between the two plates of a supercapacitor may be shorter than that of the ordinary capacitor. The plates may be composed of a conducting metal coated with a porous substance, such as activated charcoal. Such porous coating may enlarge the storage area for stored charge, or capacitance. The plates may be soaked in an electrolyte or ionic liquid and separated by a thin insulator, such as carbon, paper, or plastic. When the plates are charged, an opposite charge may form on either side of the separating insulator to create an electric double-layer. The capacitance of a supercapacitor may be determined as a function of plate area and plate distance. Supercapacitors may be connected in series or in parallel. In an example, the system may comprise one or more commercially available supercapacitors.

A battery may comprise one or more electrochemical cells that store chemical energy which may be converted to electric energy at a later time. In an example, the system may comprise one or more commercially available batteries. The batteries, for example, may be planar or rolled-type batteries. They system may comprise lithium ion, LiFePO$_4$, and/or lithium-polymer batteries which are rechargeable. The batteries may be connected in series or in parallel.

The system may further comprise a power inlet port in electrical communication with the power generating system. The power inlet port may allow electrical connection of the power generating system to the grid, solar panels, wind turbines or other power supply sources to recharge batteries and/or supercapacitors in the power generating system.

Power Control System

Figure 2A:
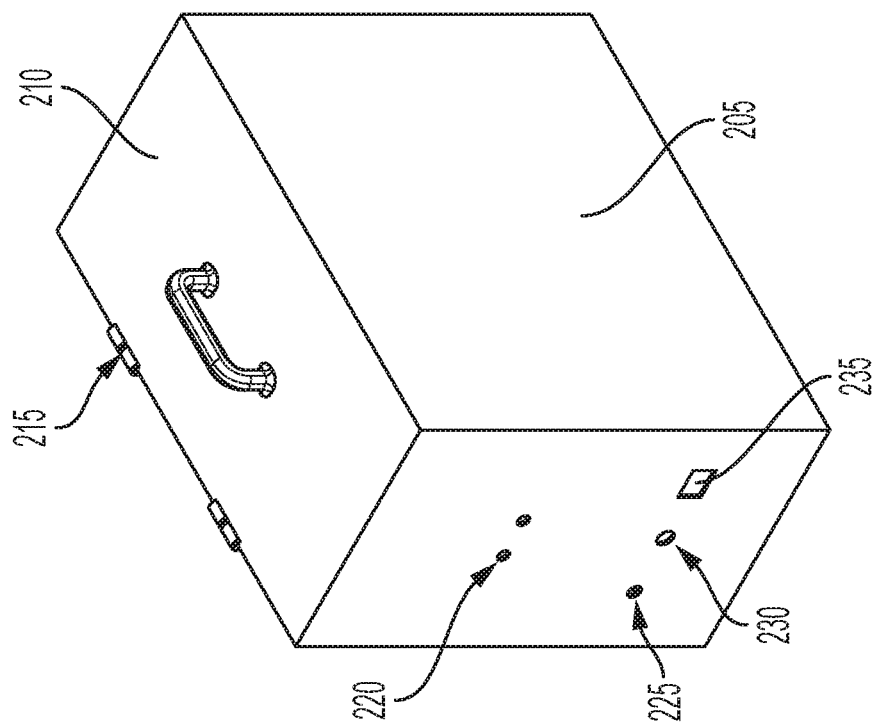
FIG. 2A shows an illustration of the casing of the fuel cell power generator.
Figure 2A:
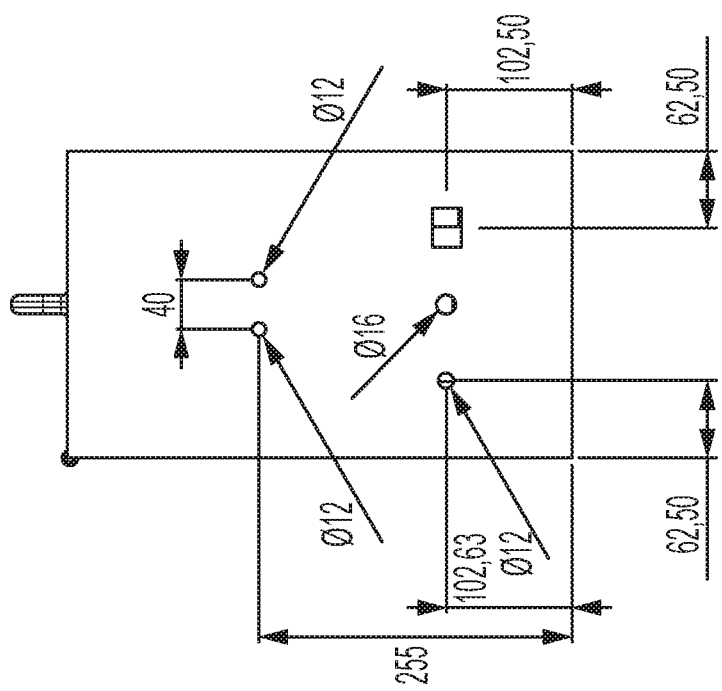

Provided is a power control system for a portable fuel cell power generator. FIG. 1 shows an illustration of a fuel cell power generator as housed in portable casing. FIG. 2A shows an illustration of the casing of the fuel cell power generator. The fuel cell power generator system may comprise three different sources of power to supply to an end-user, including one or more fuel cells or fuel cell stacks 115, one or more batteries 125, and one or more supercapacitors 120. The one or more fuel cells or fuel cell stacks are hereinafter called the fuel cell family 115. The one or more batteries are hereinafter called the battery family 125. The one or more supercapacitors are hereinafter called the supercapacitor family 120. The system may further comprise one or more power output ports, such as, for example, a 12V, 24V, or 48V output port 235, USB output port 225, high-current output port 220, and battery and/or supercapacitor charging input port 230. The high-current output port 220 may be configured to support current of up to about 600 Amperes (A). Alternatively, the high current output port 220 may be configured to support current of greater than about 600 A. The user may access the one or more output ports 220-235 via openings in the casing 205. The system may comprise a gas tank 100, or other storage vessel, to store the fuel for the fuel cell family 115, the gas tank 100 and the fuel cell family 115 connected by a fuel inlet channel 140 and an electronic valve 110. The gas tank 100 may be held in a gas tank holder 105 compartment within a casing 205. Alternatively or in addition, the gas tank 100 may be held outside of the casing, or partially within and partially outside of the casing. A user may access the gas tank 100, such as for refilling fuel, by opening the cover 210 from the casing 205. The cover 210 may be connected to the casing 205 with hinges 215. Alternatively, a cover 210 may be completely detachable from the casing 205. The system may further comprise electronic blocks 135 and converters 130, which can include electrical charging blocks and capacitors, for voltage control. The electronic blocks and converters may include a network adaptor, such as a Bluetooth or wireless internet chip, for remote control of the power control system.

Each of the fuel cell 115, battery 125, and supercapacitor 120 families may be coupled, in individual electric paths, to the one or more power output ports 220-235 of the generator system. That is, in one instance, an output port 220-235 may draw power from one of three power sources 115-120, or in another instance, from two of three power sources 115-120, or in another instance, from all three power sources 115-120. The fuel cell family 115 may be further separately coupled to the battery family 125 through one or more electric paths in which the fuel cell family 115 can recharge the battery family 125, and separately coupled to the supercapacitor 120 family through one or more electric paths in which the fuel cell family 115 can recharge the supercapacitor 120 family.

The system may further comprise a user-operable mode switch configured to direct flow of power from the fuel cell family 115 to the battery family 125 in a first instance, and direct flow of power from the fuel cell family 115 to the supercapacitor family 120 in a second instance. In one aspect, the mode switch may be binary. Alternatively, the mode switch may contemplate supplemental options such as, for example, a mode directing flow of power from the fuel cell family 115 to neither the battery family 125 nor the supercapacitor family 120, or a mode directing flow of power from the fuel cell family 115 to both the battery family 125 and the supercapacitor family 120 simultaneously. One or more mechanisms or approaches for controlling the operation of the fuel cell family 115 may be communicatively coupled to one or more output ports of a microcontroller, or other computer containing at least a processor core, memory, and input/output ports. For example, an electronic valve 110 controlling the flow of a hydrogen fuel feed from a hydrogen fuel storage vessel 100 to the fuel cell family 115 may be communicatively coupled to the microcontroller to control operation of the fuel cell family 115. The electronic valve 110 can be a solenoid valve or motorized valve. That is, the microcontroller may open the valve 110 to start energy conversion in the fuel cell family 115 and close the valve 110 to stop energy conversion in the fuel cell family 115. Similarly, one or more mechanisms or means controlling the operation of each of the battery 125 and supercapacitor 120 families may be communicatively coupled to one or more output ports of the microcontroller. For example, mechanisms such as one or more switches that determine a power family's electrical contact with the system circuit, and therefore inclusion of a power family in the system circuit, may be coupled to the microcontroller to control the respective operations of the battery 125 and the supercapacitor 120 families. For example, the microcontroller may control a switch in the system's circuit to open an electrical path from the battery family 125 to one or more power output ports, and same for the supercapacitor family 120.

In an example, the microcontroller may be configured to respond to a user input such as a power switch for the power generator system, such as between "ON" and "OFF." When the system is "ON," the microcontroller can allow the supply of power from one or more of the power source families to one or more output ports and when the system is "OFF," the microcontroller can prevent the supply of power from all of the source families. In an example, the microcontroller may be configured to respond to a user input such as a mode switch, such as between a "regular" mode and a "jump start" mode.

Figure 2B:
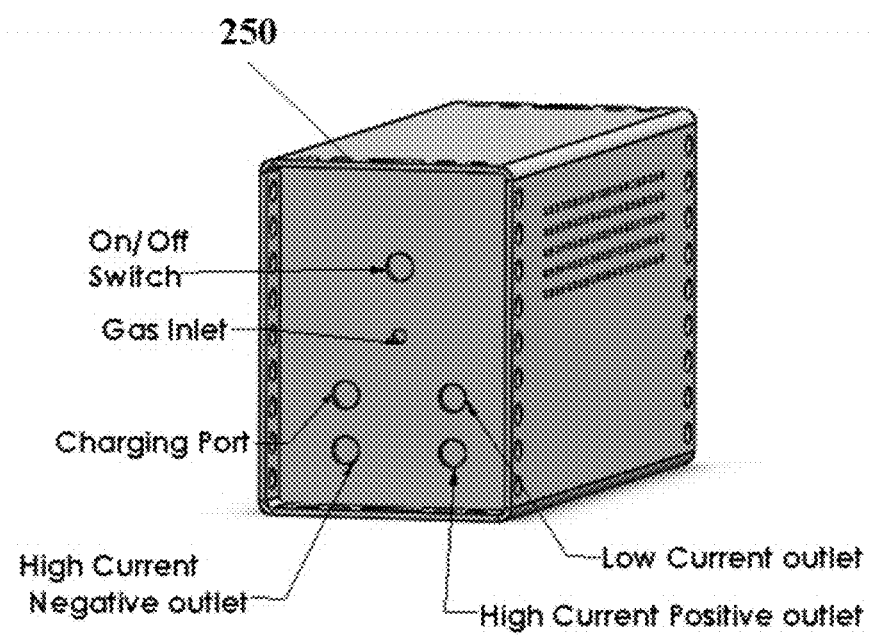
FIG. 2B shows another example of a casing of a fuel cell power generator.

FIG. 2B shows another example of a casing of a power generating system. A casing 250 may comprise one or more ports (and/or openings corresponding to the one or more ports), such as, for example, a gas inlet port, a charging port, a high current negative outlet port, a high current positive outlet port, and a low current outlet port. The high-current output port may be configured to support current of up to about 600 Amperes (A). Alternatively, the high current output port may be configured to support current of greater than about 600 A. The low current outlet port maybe configured to support current of less than about 600 A.

Figure 3:
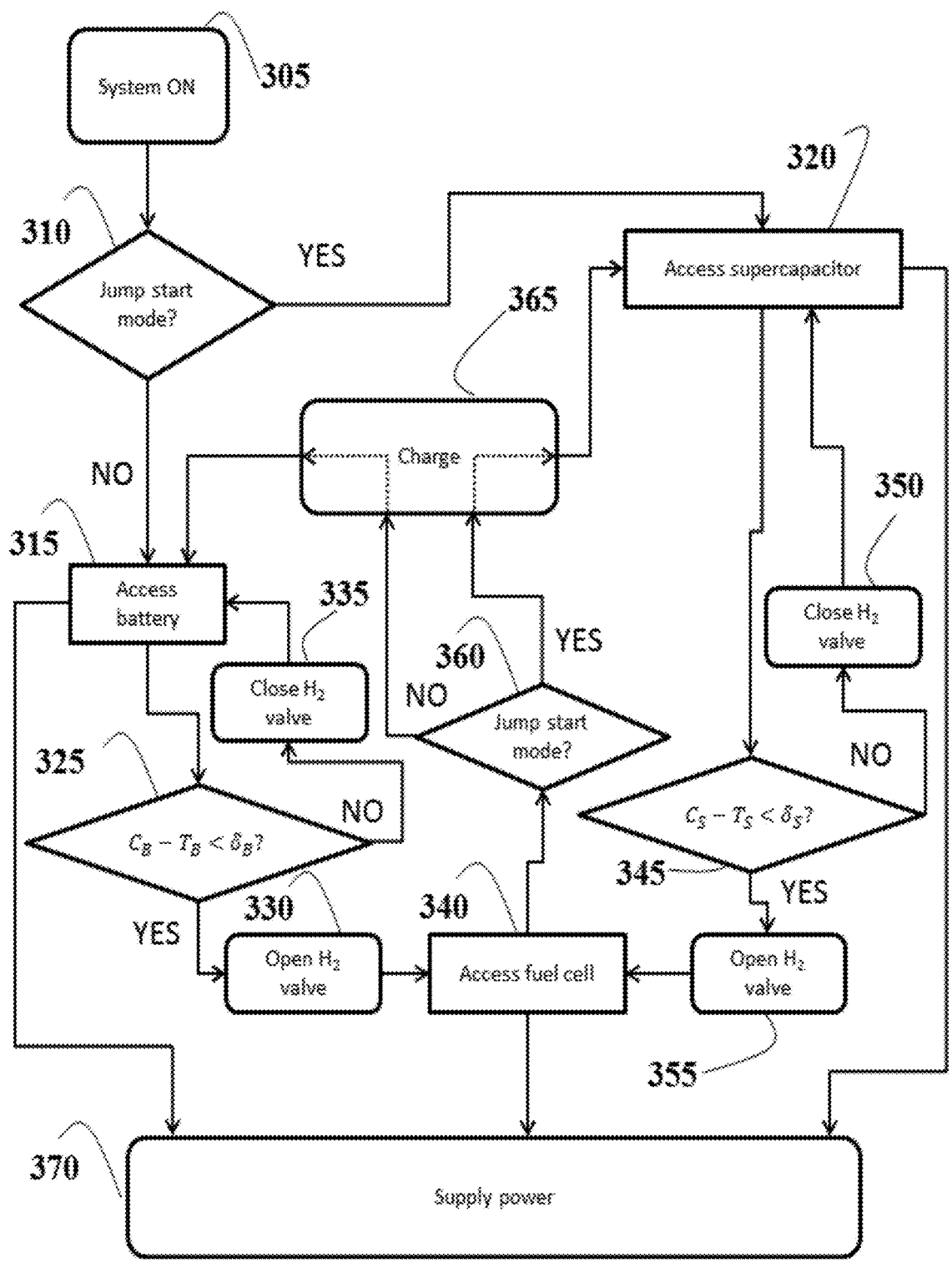
FIG. 3 shows a flowchart on how the system can navigate between a regular mode and a jump start mode.

FIG. 3 shows a flowchart on how the system can navigate between a "regular" mode and a "jump start" mode. After the system is turned ON 305, depending on which mode 310 a user has selected, the microcontroller can determine and control which of the one or more power families, including the battery 315, supercapacitor 320, and the fuel cell 340 families, to draw power from to supply to the user 370 (e.g., to an electronic device of the user). The microcontroller may determine that drawing power from only one family is appropriate and control the system (e.g., via switches, valve 350, 355) as needed. Alternatively, the microcontroller may determine that drawing power from two of the three families is appropriate and control the system as needed. Alternatively, the microcontroller may determine that drawing power from all three families is appropriate and control the system as needed. At the same time, the microcontroller may direct flow of power from the fuel cell family 340 either to recharge 365 the battery family 315 or to recharge 365 the supercapacitor family 320 depending on the mode 360. For example, the generator system may offer a "jump start" mode 310 for the user to select for when the user is using the generator system to jump start an engine or perform an operation requiring a similar power profile. When a user places the system in the "jump start" mode 310, the microcontroller can determine that power is to be supplied from the supercapacitor family 320 only and subsequently control one or more mechanisms (e.g., switches, valve 350, 355) in the system to include the supercapacitor family 320 in the system's circuit path, but to exclude the battery 315 and fuel cell 340 families. Alternatively, the microcontroller can determine that power is to be supplied 370 from both the supercapacitor family 320 (e.g., when capacitance is low 345) and the fuel cell family 340 but to exclude the battery family 315. At the same time, the microcontroller may direct flow of power from the fuel cell family 340 to recharge 365 the supercapacitor family 320. In regular mode, the microcontroller can determine that power is to be supplied 370 from the battery family 315 only and subsequently control one or more mechanisms (e.g., switches, valves 335, 330) to include the battery family 315 but to exclude the other two families 320, 340. Alternatively, the microcontroller can determine that power is to be supplied 370 from both the battery family 315 (e.g., when battery capacity is low 325) and the fuel cell family 340 but to exclude the supercapacitor family 320. At the same time, for regular mode, the microcontroller may direct flow of power from the fuel cell family 340 to recharge 365 the battery family 315 (e.g., when battery capacity is low 325).

In some examples, the system may comprise one or more sensors to detect the capacity of the battery family, $C_B$ 325, and one or more sensors to detect the capacitance of the supercapacitor family, $C_S$ 345, to determine whether to, and when to, allow a user to access power form the fuel cell family 340. The capacitance and capacity values may also determine whether to, and when to, start charging 365 a power family from power generated from the fuel cell family 340. The one or more sensors may be communicatively coupled to the microcontroller to periodically, or continuously, or upon request, transmit the $C_B$ and/or $C_S$ values to the microcontroller. The detected values $C_B$ and $C_S$ may be compared to a preprogrammed threshold value of battery capacity, $T_B$ 325, or threshold supercapacitor capacitance, $T_S$ 345, respectively, at the microcontroller. In an example, the system may set a $T_B$ at 50% and a $T_S$ at 50%. When a detected value $C_x$ is below $T_x$, or approaching the threshold value $T_x$ of the corresponding family of power such that the difference between $C_x$ and $T_x$ is less than a preprogrammed tolerance value $\delta_x$ 325, 345, the microcontroller may open an electronic valve 330, 355 to the hydrogen vessel. The fuel cell family 340 may then become a secondary power source from which to supply power 370 to the user and additionally begin charging 365 the depleted, or depleting, power source. Depending on the mode 310 the system is operating in (e.g., jump start mode, regular mode), the power generated from the fuel cell family 340 may be directed to recharge 365 either the battery family 315 or the supercapacitor family 320. For example, the system may set a battery capacity tolerance value $\delta_B$ as 2%. If, in regular mode, $C_B$ is 51%, and $T_B$ has been set at 50%, because the difference between $C_B$ and $T_B$ is 1% and less than $\delta_B$, the microcontroller can open the electronic valve 330 to the hydrogen vessel. Because the system is in regular mode 310, the microcontroller will direct at least a flow of power from the fuel cell family 340 to charge 365 the battery family 315. The system may keep the electronic valve open until the battery family is fully charged. Alternatively, the system may keep the electronic valve 335 open until the difference between $C_B$ and $T_B$ is above another pre-programmed value, or function of system variables 325. At the same time, the system may direct flow of power from the fuel cell family 340 to supply 370 to the user so that the fuel cell family 340 can supplement the battery family 315 providing power to the user. Alternatively, the system may contemplate other variables (e.g., functions other than "$C_B-T_B<\delta_B$?" 325) to determine whether to, and when to, open the hydrogen valve 330 to the fuel cell family 340. For example, the system may consider a time element of how fast a power source is being depleted.

The microcontroller may comprise one or more potential controllers for the fuel cell family 340. The controllers may measure individual cell voltages or voltages of the whole fuel cell family 340 and communicate such measurements to the power control system. This may allow for a direct measurement of potential hazards. The microcontroller may have a safe shutdown limit wherein the electrical circuit of the fuel cell family is cut off and electrical load of the valve is to shut down instantly (e.g., with less than 1 second delay) if the fuel cell family 340 reaches a negative cell voltage.

Figure 4:
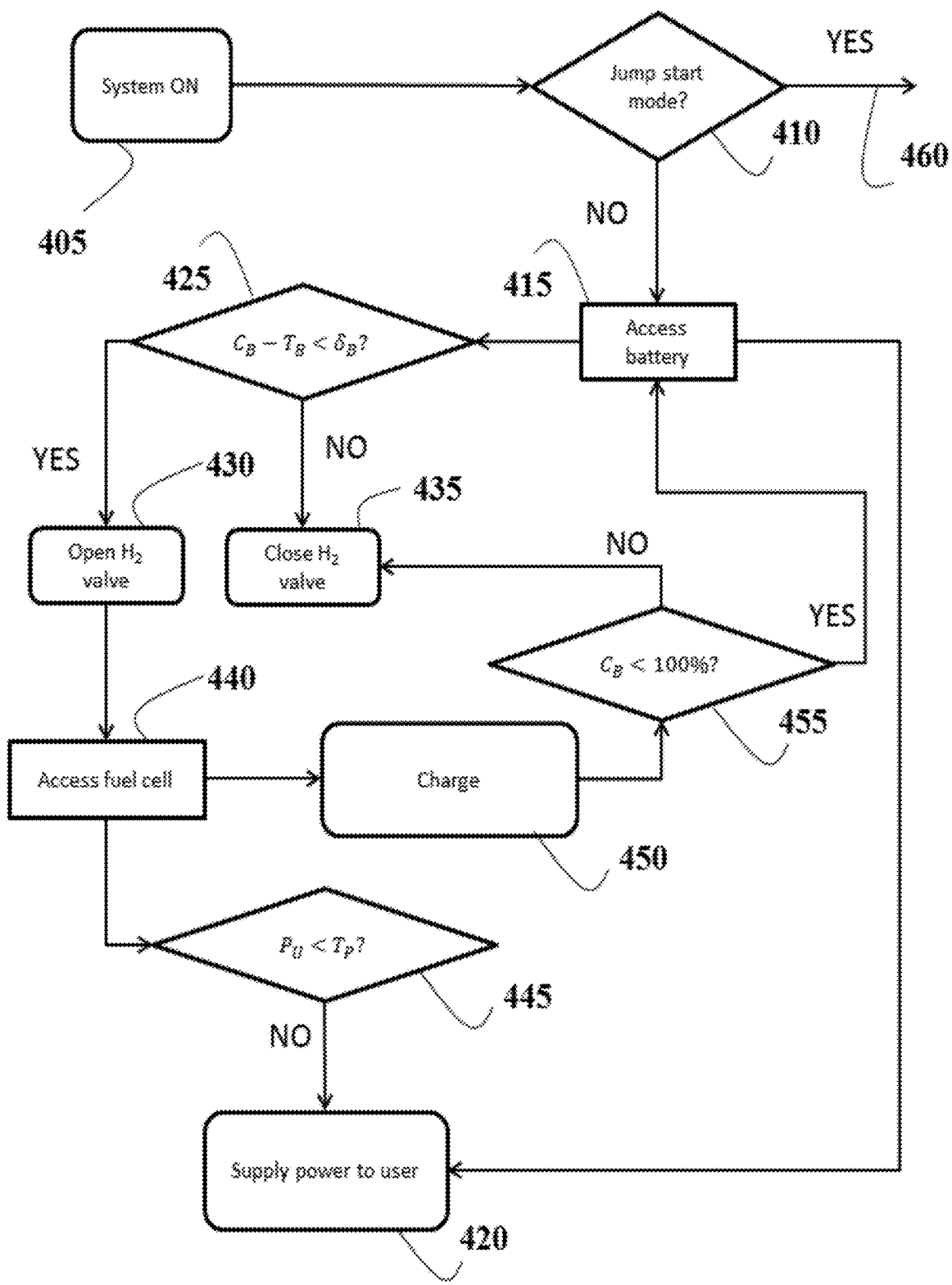
FIG. 4 shows a flowchart on how the system can distribute power in a regular mode.

FIG. 4 shows a flowchart on how the system can distribute power in a "regular" mode. In some examples, the system may comprise one or more sensors to detect the user's (e.g., user's electronic device) consumption of power, or power usage, $P_U$ 445, such as in units of Watts, to determine how to distribute the power generated from the fuel cell family 440. The one or more sensors may be communicatively coupled to the microcontroller to periodically, or continuously, or upon request, transmit the $P_U$ values to the microcontroller. The detected value $P_U$ may be compared 445 to a preprogrammed threshold value of power usage, $T_P$, at the microcontroller. In an example, the system may set a $T_P$ at 200 W. When a detected value $P_U$ is less than the threshold value $T_P$ 445, and the hydrogen valve has otherwise been opened 430 because battery capacity was detected to be approaching or less than a capacity threshold value 425, the microcontroller may direct all of the power generated by the fuel cell family 440 to charging 450 the primary source of power (e.g., the battery family 415) and have none of the power from the fuel cell family 440 be supplied to the user 420. For example, if a user, in regular mode 410, consumes 180 W of power which is being supplied 420 from the battery family 415 and the threshold value of power consumption is 200 W, and the hydrogen valve has been opened 430 because the battery capacity is less than $T_B$ 425, because $P_U$ is less than $T_P$ 445 the user will continue to get power supply 420 only from the battery family 415, and the power generated from the fuel cell family 440 can be used entirely to charge 450 the battery family 415. The hydrogen valve may be closed 435 when the battery family 415 has been charged to full capacity 455. Alternatively, the hydrogen valve may be closed 435 when the battery family 415 has been charged to another capacity value that is not 100%.

In an example, the microcontroller may receive data periodically, or continuously, or upon request, on $C_B$ or $C_S$ from the one or more sensors while the system is in an idle mode, or when the user has placed the system as "OFF," and open the electronic valve to the fuel cell family to charge either the battery family or the supercapacitor family, or both families, to full capacity or full capacitance, respectively. Alternatively, the battery family and/or the supercapacitor family may be charged to a preprogrammed partial capacity or partial capacitance, respectively. Once the battery family or the supercapacitor family has reached a desired capacity or capacitance, respectively, the microcontroller may close the valve.

In an example, the system may comprise one or more sensors to detect the capacity of the hydrogen fuel to determine how to distribute power generated from the fuel cell family between supplying power to the user and charging either the battery family or the supercapacitor family. For example, if hydrogen fuel capacity is low, the system may direct all power to charging the battery family and/or the supercapacitor family. Alternatively, the system may direct all power to supply to the user. The system may additionally display a measure of fuel capacity to the user, such as in the form of blinking lights, as reference for the user.

In some instances, the system may further comprise one or more safety features, such as sensors to detect possible leakage of fuel (e.g., hydrogen). The sensors may be communicatively coupled to the power control system to provide detection signals. The power control system can be configured to close the electronic valve and/or give an alert signal to a user upon receiving a detection signal of fuel leakage, such as above a predetermined threshold. Such alert signals (e.g., optical signals, audio signals, haptic signals, etc.) may be provided on a communication unit, such as coupled to a computer, phone, tablet, or other user device. The system may further comprise ventilators configured to vent fluid gas (e.g., flue) from one or more components of the system (e.g., a casing or box). In some instances, the ventilators may be communicatively coupled to the power control system. Upon detection of leakage, the power control system may instruct the ventilators to start venting.

In some instances, the system may further comprise features that allow easy usage and transportation. For example, the casing may comprise one or more openings, handles, ropes, adaptors, or any other attachments for use of the system in various applications (e.g., boats, recreational vehicles, cars, trucks, warehouses, and etc.). In some instances, one or more casings, such as the outer casing, or a casing for one or more components (e.g., batteries, fuel cell, supercapacitor, electronic box, valve system, etc.) may be waterproof. In some instances, the electrical contacts, fans, and other components may have an International Protection (IP) Marking of IP65 or higher. The system may be configured to endure relatively humid, wet, and/or corrosive environments to accommodate various applications (e.g., power consuming applications).

Figure 7:
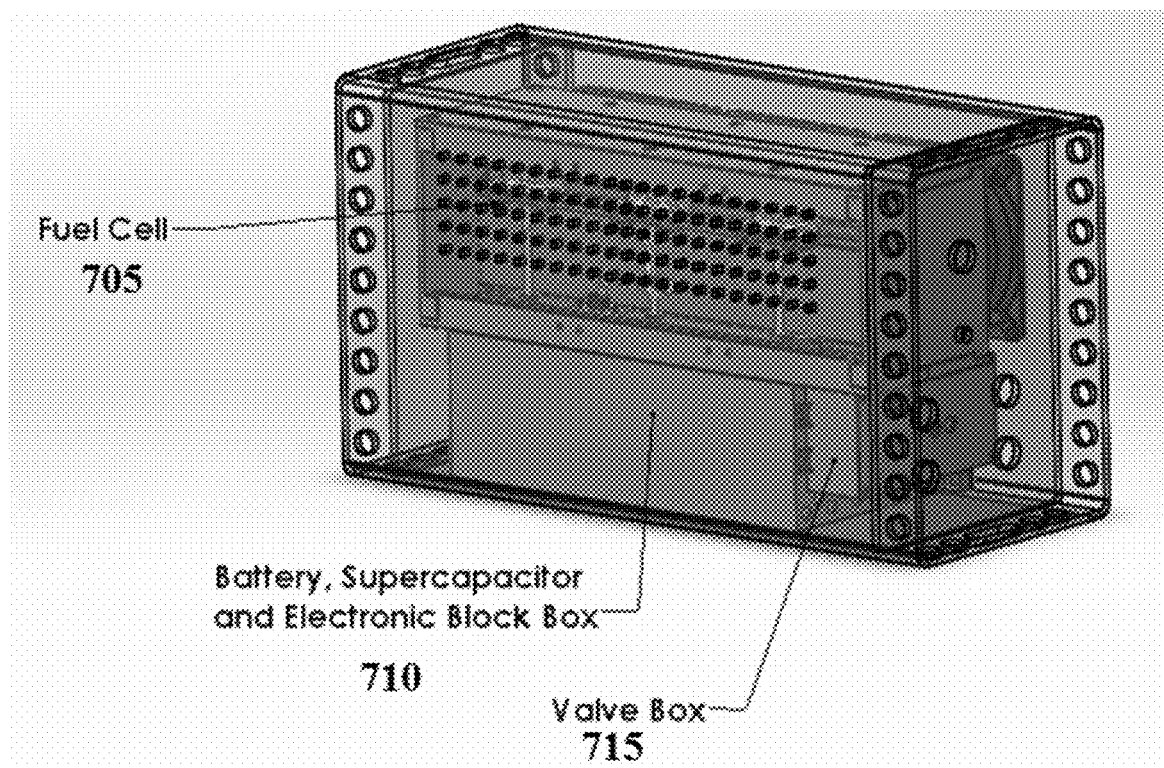
FIG. 7 illustrates an example of a modular power generating system.

Beneficially, the system may be modular. For example, a modular compartment of the fuel cell, a modular compartment of the batteries, a modular compartment of the supercapacitors, a modular compartment of the electronic box, and/or a modular compartment of the valve system may be flexibly assembled or disassembled, such as in a casing. FIG. 7 illustrates an example of a modular power generating system. The generating system may comprise a modular fuel cell compartment 705, a modular battery, supercapacitor, and electronic block compartment 710, and a valve box compartment 715, that are individually housed and configured to assemble or disassemble with each other. In some instances, each component may be housed in individual modular compartments.

While the system has been described as a power generating system, the system may be used as a power storage system.

Computer Control Systems

Figure 5:
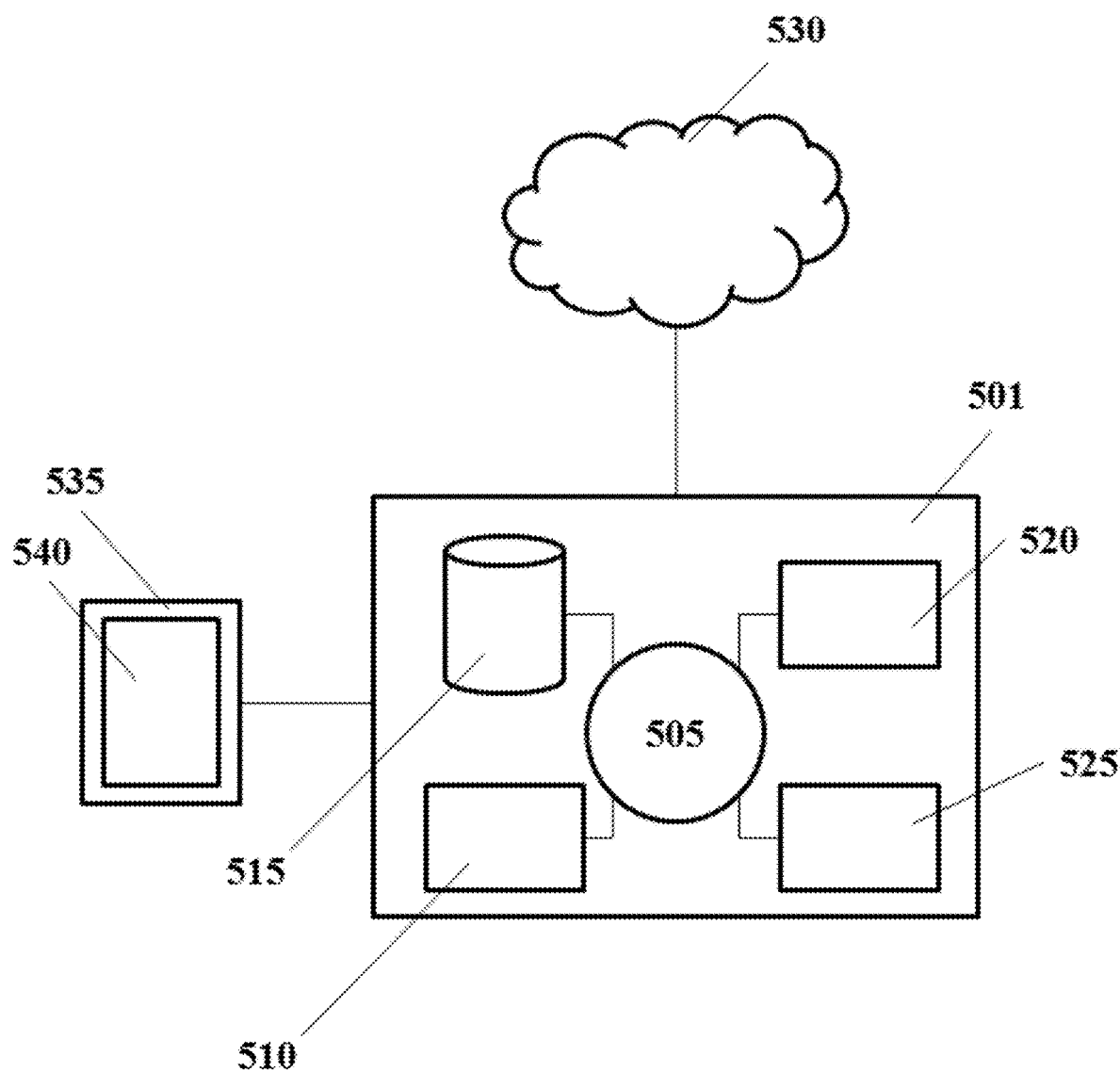
FIG. 5 shows a computer control system that is programmed or otherwise configured to implement methods provided herein.

The present disclosure provides computer control systems that are programmed to implement methods of the disclosure. FIG. 5 shows a computer system 501 that is programmed or otherwise configured to detect the system's operation mode, receive sensor signals, compare threshold values to system variables, and otherwise manipulate connective mechanisms in the system circuit such as the electronic valve to fuel feed or circuit switches. The computer system 501 can regulate various aspects of the connectivity of a power source to one or more other power sources or to the user of the present disclosure, such as, for example, the charging of the battery family or the supercapacitor family by the fuel cell family. The computer system 501 can be a microcontroller system or a computer system that is communicatively coupled to manipulate connective mechanisms in the system circuit.

The computer system 501 includes a central processing unit (CPU, also "processor" and "computer processor" herein) 505, which can be a single core or multi core processor, or a plurality of processors for parallel processing. The computer system 501 also includes memory or memory location 510 (e.g., random-access memory, read-only memory, flash memory), electronic storage unit 515 (e.g., hard disk), communication interface 520 (e.g., network adapter) for communicating with one or more other systems, and peripheral devices 525, such as cache, other memory, data storage, electronic display adapters, wireless internet chip, and/or Bluetooth chip. The memory 510, storage unit 515, interface 520 and peripheral devices 525 are in communication with the CPU 505 through a communication bus (solid lines), such as a motherboard. The storage unit 515 can be a data storage unit (or data repository) for storing data. The computer system 501 can be operatively coupled to a computer network ("network") 530 with the aid of the communication interface 520. The network 530 can be the Internet, an internet and/or extranet, or an intranet and/or extranet that is in communication with the Internet. The network 530 in some cases is a telecommunication and/or data network. The network 530 can include one or more computer servers, which can enable distributed computing, such as cloud computing. The network 530, in some cases with the aid of the computer system 501, can implement a peer-to-peer network, which may enable devices coupled to the computer system 501 to behave as a client or a server.

The CPU 505 can execute a sequence of machine-readable instructions, which can be embodied in a program or software. The instructions may be stored in a memory location, such as the memory 510. The instructions can be directed to the CPU 505, which can subsequently program or otherwise configure the CPU 505 to implement methods of the present disclosure. Examples of operations performed by the CPU 505 can include fetch, decode, execute, and writeback.

The CPU 505 can be part of a circuit, such as an integrated circuit. One or more other components of the system 501 can be included in the circuit. In some cases, the circuit is an application specific integrated circuit (ASIC).

The storage unit 515 can store files, such as drivers, libraries and saved programs. The storage unit 515 can store user data, e.g., user preferences and user programs. The computer system 501 in some cases can include one or more additional data storage units that are external to the computer system 501, such as located on a remote server that is in communication with the computer system 501 through an intranet or the Internet.

The computer system 501 can communicate with one or more remote computer systems through the network 530. For instance, the computer system 501 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 501 via the network 530.

Methods as described herein can be implemented by way of machine (e.g., computer processor) executable code stored on an electronic storage location of the computer system 501, such as, for example, on the memory 510 or electronic storage unit 515. The machine executable or machine readable code can be provided in the form of software. During use, the code can be executed by the processor 505. In some cases, the code can be retrieved from the storage unit 515 and stored on the memory 510 for ready access by the processor 505. In some situations, the electronic storage unit 515 can be precluded, and machine-executable instructions are stored on memory 510.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 501, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 501 can include or be in communication with an electronic display 535 that comprises a user interface (UI) 540 for providing, for example, a mobile device or a computer. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 505. The algorithm can, for example, run iterations to compare periodic or continuous sensor signals to pre-programmed threshold values of battery capacity, supercapacitor capacitance, or fuel cell potential values.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. An electric power generating system, comprising:
a set of fuel cells comprising an electronic valve at a fuel inlet;
a rechargeable battery;
a supercapacitor;
a user-operable mode switch configured to (i) in a first instance, direct flow of power from said rechargeable battery to an electronic device of a user and direct flow of power from said set of fuel cells to said electronic device of said user or to said rechargeable battery, and (b) in a second instance, direct flow of power from said supercapacitor to said electronic device of said user and direct flow of power from said set of fuel cells to said electronic device of said user and to said supercapacitor; and a power control system, including one or more processors and memory, communicatively coupled to said electronic valve and said user-operable mode switch, wherein said power control system is capable of electrically coupling or decoupling each of said set of fuel cells, battery, or supercapacitor relative to the other and relative to said user.

2. The electric power generating system of claim 1, further comprising an electrical inlet port in electrical communication with said rechargeable battery or said supercapacitor, wherein said electrical inlet port is configured to receive power from a power grid, solar panels, wind turbines, or any other energy generation system, to charge said rechargeable battery or said supercapacitor.

3. The electric power generating system of claim 2, further comprising one or more sensors communicatively coupled to said power control system to detect the power usage of said electronic device of said user, wherein said power control system is configured to control the flow of power from said set of fuel cells to said electronic device of said user as a function of power usage.

4. The electric power generating system of claim 1, further comprising one or more sensors communicatively coupled to said power control system to detect the capacity and capacitance of said battery and said supercapacitor, respectively, wherein said power control system controls the flow of power from said set of fuel cells to either or both said battery and said supercapacitor as a function of battery capacity and supercapacitor capacitance.

5. The electrical power generating system of claim 1, further comprising one or more sensors communicatively coupled to said power control system to detect leakage of fuel from said set of fuel cells, wherein said power control system is configured to close said electronic valve or give an alert signal to said user.

6. The electrical power generating system of claim 5, wherein said power control system is communicatively coupled to said electronic device of said user to provide said alert signal on said electronic device.

7. The electrical power generating system of claim 5, further comprising one or more ventilators configured to vent fluid gas, wherein said ventilators are communicatively coupled to said power control system, and said power control system is configured to operate said ventilators in response to detecting said leakage.

8. The electrical power generating system of claim 1, wherein said set of fuel cells is housed in a first compartment, said rechargeable battery is housed in a second compartment, said supercapacitor is housed in a third compartment, said power control system is housed in a fourth compartment, and wherein said first compartment, second compartment, third compartment, and fourth compartment is configured to modularly assemble or disassemble.

9. The electrical power generating system of claim 1, further comprising an outer casing configured to enclose said set of fuel cells, said rechargeable battery, said supercapacitor, and said power control system.

10. The electrical power generating system of claim 1, wherein said outer casing is waterproof or corrosion proof.

* * * * *